United States Patent
Parks et al.

(10) Patent No.: US 10,970,145 B2
(45) Date of Patent: Apr. 6, 2021

(54) MESSAGE COMMUNICATION OF SENSOR AND OTHER DATA

(71) Applicant: MICROSOFT TECHNOLOGY LICENSING, LLC, Redmond, WA (US)

(72) Inventors: Gregory H. Parks, Redmond, WA (US); Steven P. Dodge, Sammamish, WA (US); Zheng Wang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/697,700

(22) Filed: Nov. 27, 2019

(65) Prior Publication Data
US 2020/0097345 A1  Mar. 26, 2020

Related U.S. Application Data

(63) Continuation of application No. 15/375,878, filed on Dec. 12, 2016, now Pat. No. 10,503,571, which is a continuation of application No. 14/708,183, filed on May 8, 2015, now Pat. No. 9,519,529, which is a continuation of application No. 13/626,870, filed on Sep. 25, 2012, now Pat. No. 9,032,418, which is a continuation of application No. 12/565,740, filed on Sep. 23, 2009, now Pat. No. 8,276,159.

(51) Int. Cl.
*G06F 9/54* (2006.01)

(52) U.S. Cl.
CPC .............. *G06F 9/546* (2013.01); *G06F 9/542* (2013.01); *G06F 2209/544* (2013.01)

(58) Field of Classification Search
CPC ............. G06F 9/54; G06F 9/542; G06F 9/545
USPC ........................................ 719/313, 318, 328
See application file for complete search history.

(56) References Cited

U.S. PATENT DOCUMENTS 8,229,163 B2 *  7/2012  Coleman .............. G06K 9/3241
382/103
8,478,642 B2 *  7/2013  Dey ................. G08G 1/096844
705/14.4

OTHER PUBLICATIONS

"Examiner Decision of Final Refusal Issued in Indian Patent Application No. 1783/CHENP/2012", dated Sep. 29, 2020, 6 Pages.

* cited by examiner

*Primary Examiner* — Andy Ho
(74) *Attorney, Agent, or Firm* — Workman Nydegger

(57) ABSTRACT

A service may be provided that reads sensors, and that communicates information based on the sensor readings to applications. In one example, an operating system provides a sensor interface that allows programs that run on a machine to read the values of sensors (such as an accelerometer, light meter, etc.). A service may use the interface to read the value of sensors, and may receive subscriptions to sensor values from other programs. The service may then generate messages that contain the sensor value, and may provide these messages to programs that have subscribed to the messages. The messages may contain raw sensor data. Or, the messages may contain information that is derived from the sensor data and/or from other data.

20 Claims, 4 Drawing Sheets

MESSAGE COMMUNICATION OF SENSOR AND OTHER DATA

CROSS-REFERENCE TO RELATED APPLICATIONS

This application is a continuation of U.S. patent application Ser. No. 15/375,878 filed on Dec. 12, 2016, entitled "MESSAGE COMMUNICATION OF SENSOR AND OTHER DATA", which is a continuation of U.S. application Ser. No. 14/708,183 filed on May 8, 2015, entitled "MESSAGE COMMUNICATION OF SENSOR AND OTHER DATA," which issued as U.S. Pat. No. 9,519,529 on Dec. 13, 2016, which is a continuation of U.S. patent application Ser. No. 13/626,870 filed on Sep. 25, 2012, entitled "MESSAGE COMMUNICATION OF SENSOR AND OTHER DATA," which issued as U.S. Pat. No. 9,032,418 on May 12, 2015, which is a continuation of U.S. patent application Ser. No. 12/565,740 filed on Sep. 23, 2009, entitled "MESSAGE COMMUNICATION OF SENSOR AND OTHER DATA," which issued as U.S. Pat. No. 8,276,159 on Sep. 25, 2012, the entirety of each of which are incorporated herein by reference.

BACKGROUND

Computers and other machines are often equipped with sensors that allow the machine to detect various aspects of its environment. For example, a machine could be equipped with an accelerometer, Global Positioning System (GPS) receiver, light sensor, etc. These sensors allow the machine to detect motion, position, and ambient light, respectively.

A machine may provide some type of interface to the sensors so that software on the machine can read data from the sensors. For example, a computer's operating system may provide an application programming interface (API) that allows applications, and other programs, on the computer to read the sensor values. For example, a program could call an API function to obtain the current acceleration vector from the accelerometer, or the current latitude and longitude from the GPS receiver.

While a sensor interface, such as that described above, allows programs to read sensor values, for a program to use the sensor interface directly may complicate the design of the software. Programs typically have complex control flow loops that respond to various events. Including logic that reads the sensors and responds to sensor values complicates the control flow, and other aspects, of the program. Due to the complexity of using sensor data through a typical sensor interface, many programs do not make use of sensor data.

BRIEF SUMMARY

Sensor data, and other kinds of data, may be provided to an application (or other type of program) through a simple lightweight messaging mechanism. In one example, a sensor service uses a sensor interface (such as a sensor API) to read sensor values. Programs that want to receive sensor values may subscribe to sensor notifications through the sensor service. The sensor service may determine, based on various triggers (e.g., changes in sensor values, passage of time, etc.), to generate messages that communicate sensor values to the subscribing program(s). For example, an application might subscribe to receive accelerometer readings. The sensor service could use a sensor API to poll the accelerometer periodically for its current readings, and could generate a message whenever the accelerometer values change. This message could then be sent to the subscribing application. Since applications are typically built to handle messages and other types of interrupts received from external sources, the application can process the messages using these kinds of message-handling mechanism. Designing the application to receive and process the messages may be less complex than designing the application to read sensor values directly through the sensor interface.

The sensor service may send raw sensor values to the applications. Or the sensor service may process the sensor values in some way, and may send information that is derived from the sensor values using high-level abstractions. For example, the sensor service may use a high-level model to detect a walking motion based on the pattern of changes in accelerometer readings. In addition to using sensor data in such high-level models, the sensor service may also use other data, such as data from a database, data from a user's calendar, data from the Internet, etc. Thus, an application may subscribe to messages that report sensor data and/or message that report other types of information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
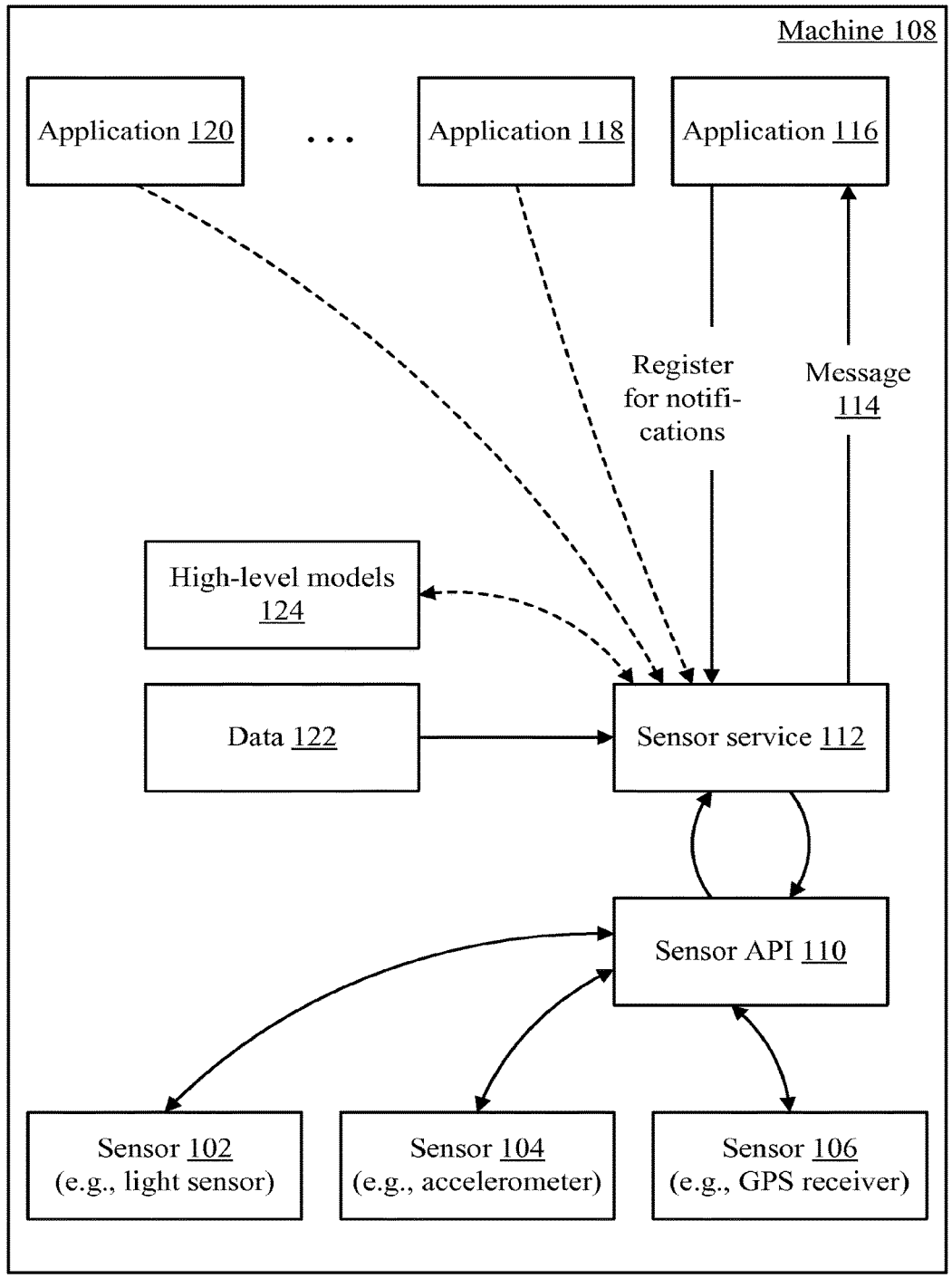
FIG. 1 is a block diagram of an example scenario in which messages may be used to communicate sensor data, and other data, to applications.

A machine, such as a computer, may be equipped with sensors that allow the machine to detect feature of the environment in which it operates. For example, a machine could be equipped with a light sensor that detects the amount and/or color of light present at the machine. Or, the machine could be equipped with an accelerometer that detects changes in motion, a Global Position System (GPS) receiver that detects changes in absolute position, or some other type of sensor.

Machines typically have some kind of operating system which, among other things, provides an interface between the machine's hardware and the software that runs on the machine. For example, an operating system may provide an application programming interface (API) that allows software to interact with the sensors. Thus, an application might call a function provided by the API to request the current acceleration vector (as read by the accelerometer), the current latitude and longitude (as read by GPS receiver), or some other sensor reading.

The way in which certain APIs are used can complicate the design of a program. For example, an API might provide a function that an application can call to request a sensor reading, as described above. While such a function allows an application to obtain the sensor readings, incorporating such readings into the application's runtime loop increase the complexity of the application. Such an application would have to include code that requests a reading periodically, or that requests a reading in response to some kind of event. In general, an application that wants to read sensors with an API may have to include significant code to initialize and instantiate the API, and to manage the data that comes from the API. The fact that such code is called for in order to use the API may discourage some software designers from using sensor data in a program. Additionally, one implementation of an API—the Sensor API for the MICROSOFT WINDOWS operating systems—is designed in such a way each application that uses the API instantiates a separate copy of the API, due to the in-process nature of the API. In some situations involving large numbers of applications running simultaneously, and/or large numbers of sensors, this design may consume excess system resources. As an alternative making direct function calls to read sensors, a technology such as Component Object Model (COM) could be used. Thus, a COM object could obtain sensor readings (e.g., using Sensor API), and applications that want to obtain the readings could implement callbacks specified by the COM interface, which the COM object would use to send sensor data to the applications in response to certain types of events. However, in the context of reading sensors, a COM implementation might consume more resources than are needed.

The subject matter herein uses a messaging protocol to communicate sensor information to applications. A sensor service acts as an intermediary between applications and a sensor interface, and communicates sensor data to the application in the form of messages. Thus, the sensor service uses the sensor interface (e.g., the Sensor API for the MICROSOFT WINDOWS operating systems) to obtain sensor data. The sensor service also receives subscription requests from applications, whereby applications request to receive sensor data (or certain types of sensor data). The sensor data then pushes, to the applications, messages containing sensor data to which the applications have subscribed. The messaging protocol may be made simple and lightweight, thereby putting relatively little tax on a machine's resources.

In one example, the sensor service may simply pass along raw data received from sensors. However, in another example, the sensor service may refine the data in some way. For example, a light sensor reading may contain detailed values in some color space (e.g., separate red, green, and blue values). However, if an application cares only about the color temperature that is present at a machine, then the sensor service might convert the red, green, and blue values into a color temperature value, which it could provide to the application. Additionally, refinement of data can be based on information from multiple sensors, or on information other than the sensors themselves. For example, the sensor service might contain logic that detects motion based on a combination of accelerometer and GPS data, or might determine the location of the nearest restaurant (or gas station, or hospital) based on the current latitude and longitude (as read from the GPS receiver) and further based on a database that indicates the latitude and longitude of certain establishments. Once the sensor service is equipped with such logic, the sensor service can use the same basic message infrastructure to provide either raw sensor data, or information based on arbitrary levels of abstraction.

Turning now to the drawings, FIG. 1 shows an example scenario in which messages may be used to communicate sensor data, and other data, to applications. In the scenario of FIG. 1, various sensors 102, 104, and 106 collect various types of data. For example, sensor 102 may be a light sensor that detects the color and/or temperature of light in the vicinity of the light sensor. Sensor 104 may be an accelerometer that detects the direction and/or magnitude of acceleration that the sensor is undergoing. Sensor 106 may be a GPS receiver that communicates with satellites in order to triangulate the sensor's current latitude and longitude. Sensors 102, 104, and 106 may be attached to a particular computer or other machine (e.g., machine 108). In such a case, these sensors effectively sense the acceleration, latitude, longitude, etc., of the machine to which they are attached. However, sensors 102-106 could be physically disassociated from machine 108. Moreover, FIG. 1 shows an example in which the sensors are a light meter, an accelerometer, and a GPS receiver, but the subject matter herein could be used with any type of sensor.

An operating environment present at machine 108 may provide a sensor application programming interface (API) 110. Sensor API 110 provides a mechanism through which programs that execute on machine 108 may interact with sensors 102-106. An application (or an operating system component, a driver, a plug-in, etc.) could use sensor API 110 to read the values of sensors 102-106. Thus, if a particular program wants to know the current latitude and longitude of machine 108, then that program could issue a call to a function provided by sensor API 110. The function may communicate with the relevant hardware driver for the GPS receiver (which is sensor 106 in this example), and may return the current latitude and longitude readings. A set of functions that programs can call to read sensor values is one example implementation of sensor API 110. However, sensor API 110 could be implemented in any appropriate manner. As another example, sensor API 110 could be implemented as a Component Object Model (COM) object, where a program implements a set of callbacks that allows the COM object to communicate with the program.

While an application program could interact with sensor API 110 directly, in the example of FIG. 1 the direct consumer of the information that sensor API 110 provides is sensor service 112. Sensor service 112 uses sensor API to gather data from sensors 102-106, and then packages this sensor data (or information derived from the sensor data) in the form of messages, such as message 114. These messages may be provided to an application, such as application 116. Sensor service 112 may use a message service to deliver messages to applications. The message service could be provided by sensor service 112; or, sensor service could make use of a message service that is provided by some other component (such as a message service that the operating system provides so as to allow different executable components on a given machine to communicate with each other). An application, such as application 116, may subscribe to certain sensor events by registering with sensor service 112 to receive notifications of those events. For example, application 116 might subscribe to receive notifications of changes in machine 108's latitude and longitude. In such an example, sensor service 112 might use sensor API 110 to poll sensor 106 (the GPS receiver) periodically for the current latitude and longitude. Sensor service 112 could then generate messages when the latitude and longitude change, or could issue a message after the passage of some amount of time (e.g., every minute) even if there is no change.

In addition to application 116, there could be one or more other applications on machine 108, such as applications 118 and 120. These applications could register separately for notifications of certain events (as indicated by the dashed lines from applications 118 and 120 to sensor service 112). For example, application 118 might register to receive notification of changes in acceleration, and application 120 might register to receive notification of light readings and latitude/longitude. Any application could register to receive any type of messages from sensor service 112.

In one example, messages are used to convey raw sensor data. However, in other examples, message could be used to convey higher-level conclusions that are derived from sensor data, from other data, or from a combination of both sensor data and other data. For example, sensor service 112 may obtain data 122 from sources other than the sensors themselves. Sensor service 112 may employ one or more high-level models 124 that, when forming conclusions, take into account data from sensors 102-106, other data 122, or some combination of sensor data and other data. For example, a high-level model could attempt to determine where a person is going, based on a person's calendar, and also based on changed in the location of a device the person is carrying. In such a case, a high-level model could combine sensor data (latitude and longitude reported by a GPS receiver) with other data 122 (which, in this case, would be appointments from a person's calendar), in order to form a conclusion about where the person is going. (E.g., the model might reason, "The person who owns this device is walking toward the administration building, and has an appointment with the company president on his calendar; therefore, the person's current destination is the office of the company president.") An application could subscribe to "destination" notifications, and sensor service 112 could issue a message to that application when an appropriate high level model has determined where the person is going. It is noted that, when a model is used to draw conclusions from sensor data and/or from other data, the conclusions drawn by the model (and, therefore, the information contained in messages based on the model) would differ from the raw sensor data. Thus, if a model determines that a person is walking based on changes in accelerometer readings, the messages that are sent to an application might indicate that a person has started and/or stopped walking. The accelerometer senses acceleration vectors, but does not sense the commencement or cessation of walking directly, and thus messages based on a "walking" model would differ from the actual sensor readings.

Figure 2:
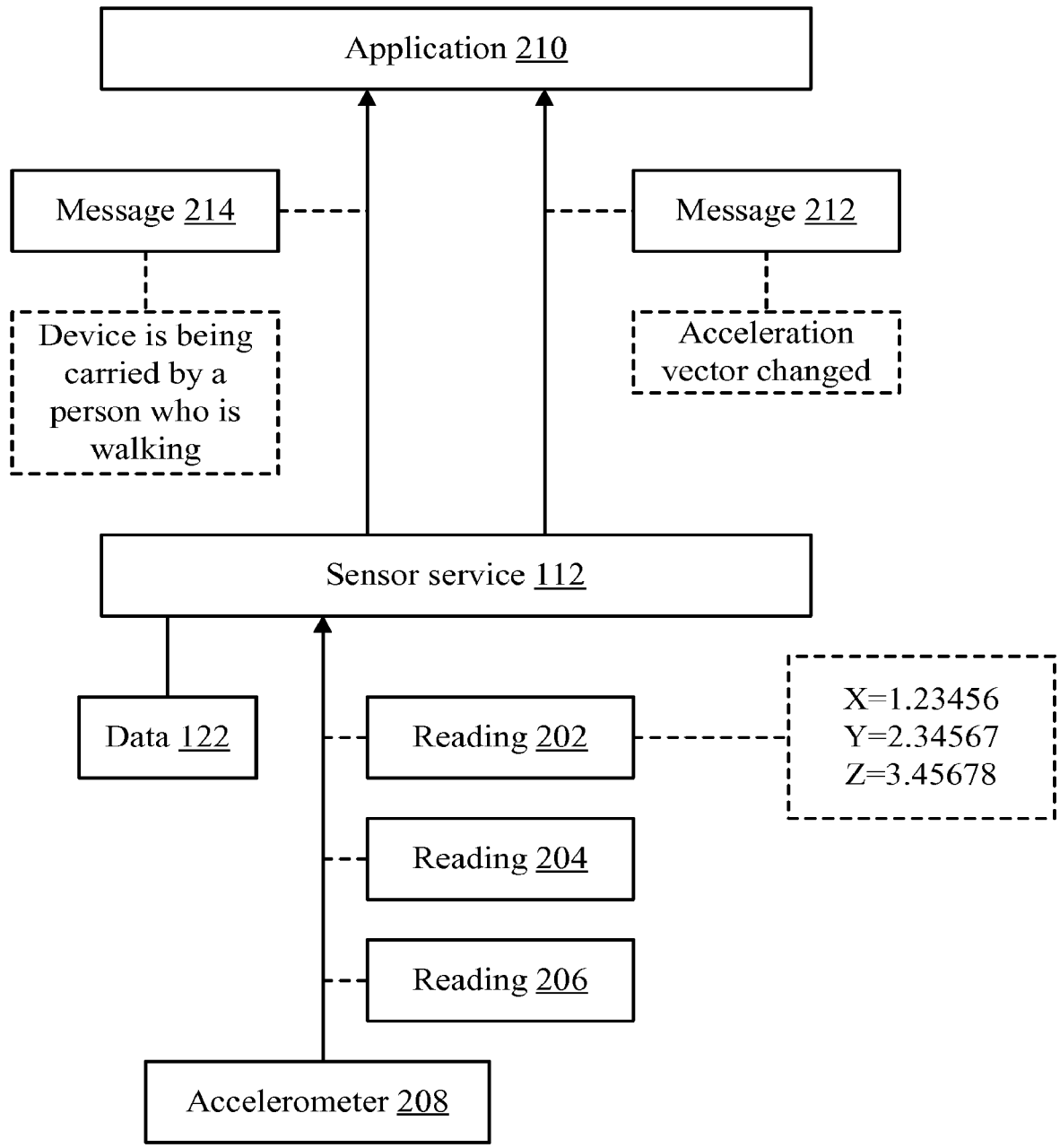
FIG. 2 is a block diagram of an example in which a sensor service uses sensor readings, and possibly other data, to create messages.

FIG. 2 shows an example of how a sensor service may use sensor readings, and possibly other data, to create messages. In the example of FIG. 2, sensor service 112 takes readings 202, 204, and 206, from a sensor. Sensor service may take readings 202-206 in any manner. For example, there may be a sensor interface (such as sensor API 110, shown in FIG. 1), which allows programs to take sensor readings, although the subject matter herein is not limited to the example in which a sensor API is used.

In the example of FIG. 2, the sensor from which readings are taken is accelerometer 208, although any type of sensor could be used. In the case where the sensor is an accelerometer, that sensor may produce acceleration vectors as readings. For example, reading 202 contains an indication of a particular acceleration vector (given by the acceleration values in the X, Y, and Z dimensions). Readings 204 and 206 could show the same values for the acceleration vector (if the acceleration does not change between readings), or could show different values for the acceleration vector (if the acceleration vector has changed between readings).

Sensor service 112 may generate messages based on sensor readings, where the messages are to be sent to subscribing applications. An application, such as application 210, may subscribe to certain types of messages by registering with sensor service 112. In one example, application 210 registers to receive sensor data. Thus, application 210 could receive a message 212, which indicates that the acceleration vector has changed, and also indicates the current value of the acceleration vector. In the example of FIG. 2, the sending of message 212 may be triggered by a change in the acceleration vector. That is, sensor service 112 could monitor accelerometer readings, and could send a message to subscribing applications whenever the value of the sensor reading changes. However, sensor service 112 could send a message in response to any sort of trigger, of which a change is a sensor reading is merely one example. As another example, sensor service 112 could send a message after the passage of n units of time (e.g., after every n second), in which case the passage of time is the trigger to send the message.

While sensor service 112 could send messages to report on sensor readings, sensor service 112 could also send message to report on higher-level concepts based on abstract models. For example, sensor service 112 could send message 214 to indicate that a particular type of motion has started or stopped. In the example of FIG. 2, accelerometer 208 might be attached to a device that can be carried by a person, and message 214 might indicate that the person is walking. The conclusion that the person is walking might be based on the use of high-level models of different types of motion to analyze the pattern of changes in the acceleration vector. Thus, sensor service 112 could send messages that are based on raw sensor data (as in the case of message 212), or could send messages that are based on conclusions that high-level models draw from the sensor data (as in the case of message 214). As noted above, in connection with FIG. 1, when sensor service 112 uses high level models to generate messages, sensor service 112 may use sensor data, but may also use other data 122, which could be any type of data (e.g., data from a database, data from a user's calendar, data retrieved from the Internet, etc.).

Figure 3:
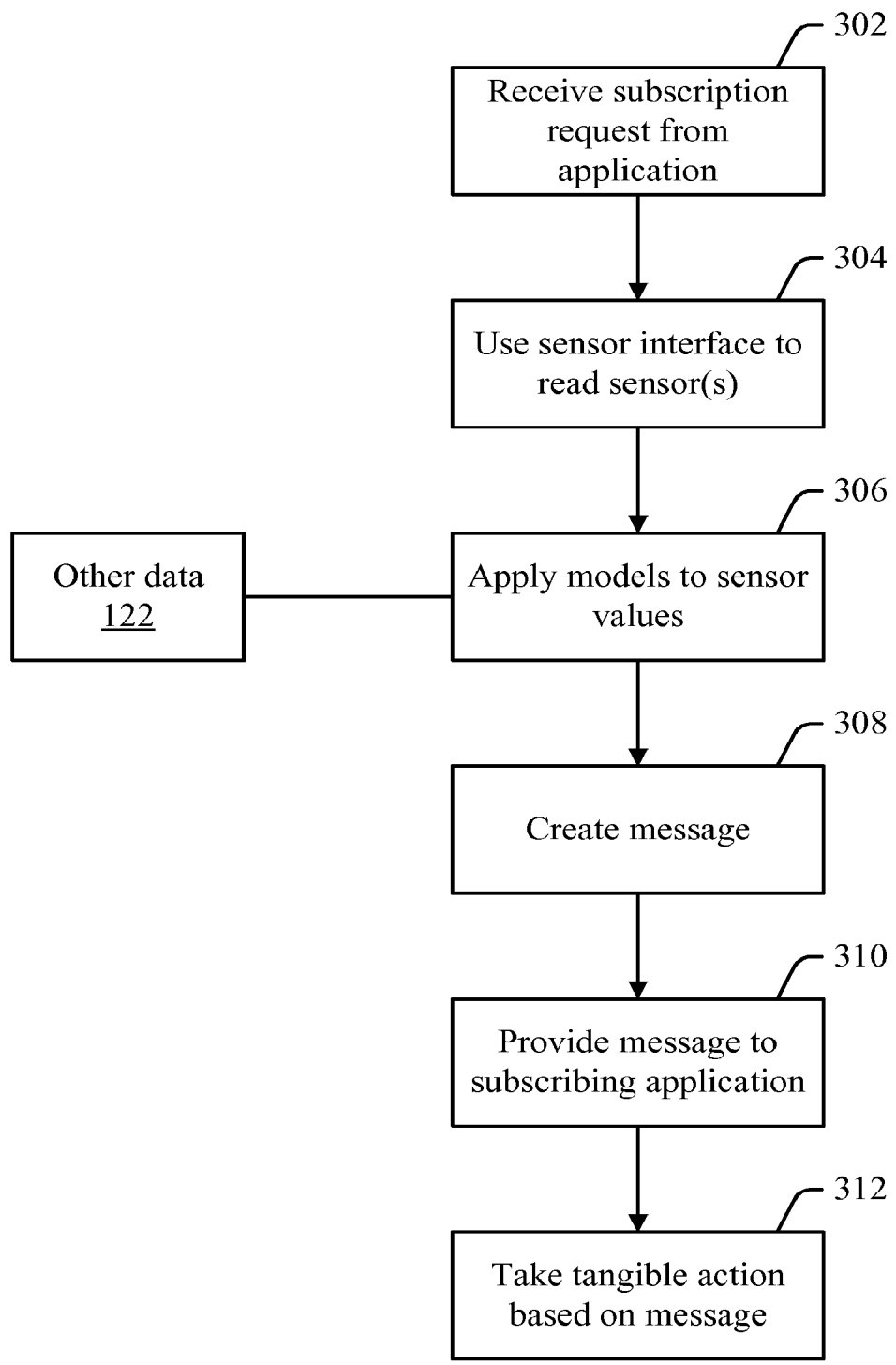
FIG. 3 is a flow diagram of an example process in which messages may be generated and sent to programs.

FIG. 3 shows, in the form of a flow chart, an example process in which messages may be generated and sent to subscribing applications. Before turning to a description of FIG. 3, it is noted that the flow diagram of FIG. 3 is described, by way of example, with reference to components shown in FIGS. 1-2, although this processes may be carried out in any system and is not limited to the scenarios shown in FIGS. 1-2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

At 302, a subscription request may be received from an application (or other type of program). Thus, an application may subscribe to receive notifications of sensor values, or to receive certain kinds of events with respect to sensor values. For example, an application might subscribe to receive accelerometer readings. The application might subscribe to a message reporting the acceleration vector every five seconds, or every time the acceleration vector changes, or in response to some other trigger. The application might request all acceleration data, or only certain acceleration data.

At 304, a sensor interface is used to read sensor value. For example, sensor service 112 (shown in FIG. 1) might use sensor API 110 (also shown in FIG. 1) to read sensor values. Sensor service 112 might have a loop that periodically reads those from the sensors using sensor API 110 (or some other sensor interface), and that determines, based on the values and changes thereto, what messages to report.

At 306, models may be applied to sensor values. A model may attempt to draw conclusions from raw sensor data—e.g., a model might conclude that a device is being moved through human walking, based on an analysis of acceleration vector readings. Models may be based solely on sensor data, or may be based on some combination of sensor data and other data 122, as previously described in connection with FIGS. 1 and 2. While a sensor service could apply a model at 306, in an alternative example the sensor service might apply no model and might simply report raw sensor data.

At 308, a message may be created to convey sensor data and/or to convey conclusions formed by high-level models. In one example (e.g., in certain versions of the MICROSOFT WINDOWS operating systems), a message with the type "WM_CONTEXT" may be created, where the format of the WM_CONTEXT could be made generally known to software developers via a published specification. Thus, third-party applications and other third-party programs can receive and interpret sensor data (and other types of information) that is conveyed in a WM_CONTEXT message. However, the subject matter herein is not limited to the use of a WM_CONTEXT message; any type of message could be used.

At 310, the message that was created may be provided to a subscribing application (or other program). For example, a messaging infrastructure could be used to push a message, such as a WM_CONTEXT message, to an application that has subscribed to receive such messages.

At 312, the application (or other program) may take a tangible action based on the received message. For example, the application could communicate information to a person based on the received message, or could store information based on the message in some tangible form. To use one example from above, if the message indicates the current accelerometer readings, an application could display the current accelerometer readings contained in the message.

Figure 4:
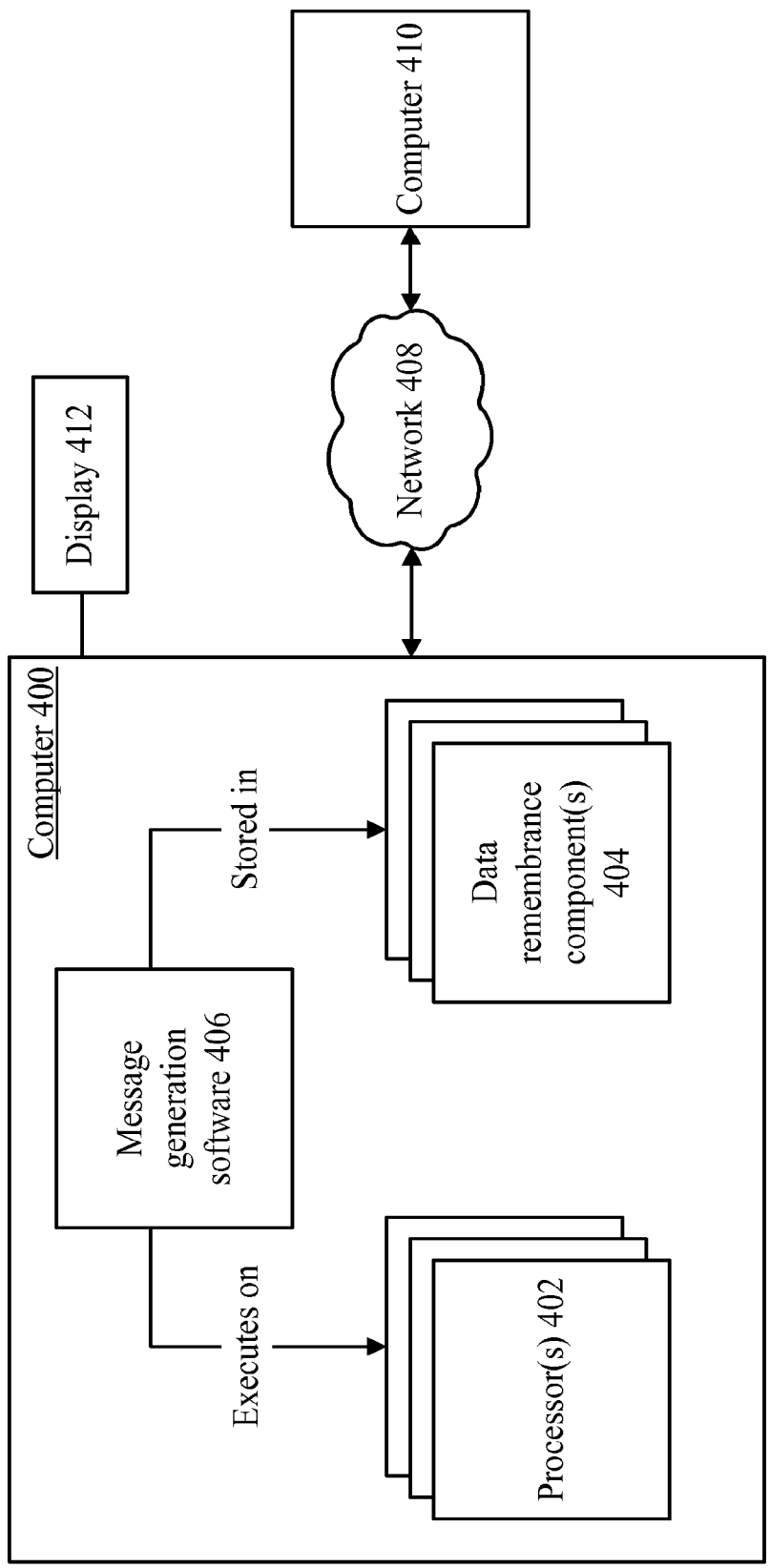
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is message generation software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
    an application programming interface (API);
    a sensor service acting as an intermediary between the API and one or more applications;
    one or more processors; and
    one or more computer-readable hardware storage devices having stored thereon computer-executable instructions that are executable by the one or more processors to cause the sensor service of the computer system to at least:
        use the API to obtain raw data from one or more sensors;
        obtain source data from a source that is different than the one or more sensors;
        employ a model to derive, based on a combination of the raw data and the source data, a high-level conclusion describing an outcome (i) that is determined will likely happen or that is currently happening and (ii) that is different from a determination the one or more sensors would provide to the sensor service based on the raw data alone;
        identify an application that is subscribed to receive notifications describing conclusions corresponding to a particular type of outcome; and in response to determining that the high-level conclusion corresponds to the particular type of outcome to which the application is subscribed, send a notification comprising the high-level conclusion to the application.

2. The computer system of claim 1, wherein the one or more sensors are a part of the computer system.

3. The computer system of claim 1, wherein the one or more sensors are external to the computer system.

4. The computer system of claim 1, wherein the API is an operating system (OS) API of the computer system.

5. The computer system of claim 1, wherein the sensor service additionally pushes the raw data to the application.

6. The computer system of claim 1, wherein the raw data is accelerometer data, wherein the source data is one of global positioning system (GPS) data, calendar data, Internet data, or data from an additional sensor, and wherein the high-level conclusion indicates that a user of the computer system is currently traveling and further indicates that the user is traveling to a particular identified location.

7. The computer system of claim 1, wherein the high-level conclusion indicates whether a particular type of motion is occurring.

8. The computer system of claim 1, wherein the model analyzes patterns of change in the raw data.

9. The computer system of claim 1, wherein the sensor service causes the API to periodically poll the one or more sensors.

10. The computer system of claim 1, wherein the sensor service sends additional notifications comprising updated conclusions after passage of a determined period of time subsequent to the notification or, alternatively, sends the additional notifications comprising the updated conclusions in response to a detected change in the raw data.

11. A method for generating high-level conclusions based off of a combination of raw sensor data and additional data, said method being performed by a sensor service, which acts as an intermediary between an application programming interface (API) of a computer system and one or more applications, said method comprising the sensor service at least:
    using the API to obtain raw data from one or more sensors;
    obtaining source data from a source that is different than the one or more sensors;
    employing a model to derive, based on a combination of the raw data and the source data, a high-level conclusion describing an outcome (i) that is determined will likely happen or that is currently happening and (ii) that is different from a determination the one or more sensors would provide to the sensor service based on the raw data alone;
    identifying an application that is subscribed to receive notifications describing conclusions corresponding to a particular type of outcome; and
    in response to determining that the high-level conclusion corresponds to the particular type of outcome to which the application is subscribed, sending a notification comprising the high-level conclusion to the application.

12. The method of claim 11, wherein the one or more sensors are a part of the computer system.

13. The method of claim 11, wherein the one or more sensors are external to the computer system.

14. The method of claim 11, wherein the API is an operating system (OS) API of the computer system.

15. The method of claim 11, wherein the high-level conclusion indicates whether a particular type of motion is occurring.

16. The method of claim 11, wherein the model analyzes patterns of change in the raw data.

17. The method of claim 11, wherein the sensor service causes the API to periodically poll the one or more sensors.

18. The method of claim 11, wherein the sensor service sends additional notifications comprising updated conclusions after passage of a determined period of time subsequent to the notification or, alternatively, sends the additional notifications comprising the updated conclusions in response to a detected change in the raw data.

19. One or more hardware storage devices having stored thereon computer-executable instructions that are executable by one or more processors of a computer system, which includes (i) an application programming interface (API) and (ii) a sensor service acting as an intermediary between the API and one or more applications, to cause the sensor service of the computer system to at least:
    use the API to obtain raw data from one or more sensors;
    obtain source data from a source that is different than the one or more sensors;
    employ a model to derive, based on a combination of the raw data and the source data, a high-level conclusion describing an outcome (i) that is determined will likely happen or that is currently happening and (ii) that is different from a determination the one or more sensors would provide to the sensor service based on the raw data alone;
    identify an application that is subscribed to receive notifications describing conclusions corresponding to a particular type of outcome; and
    in response to determining that the high-level conclusion corresponds to the particular type of outcome to which the application is subscribed, send a notification comprising the high-level conclusion to the application.

20. The one or more hardware storage devices of claim 19, wherein the sensor service sends additional notifications comprising updated conclusions after passage of a determined period of time subsequent to the notification or, alternatively, sends the additional notifications comprising the updated conclusions in response to a detected change in the raw data.

* * * * *